(12) United States Patent
Bayat et al.

(10) Patent No.: US 7,202,614 B2
(45) Date of Patent: Apr. 10, 2007

(54) ELECTRONIC BALLAST FOR A FLUORESCENT TASK LAMP

(75) Inventors: Bijan Bayat, Dallas, TX (US); James Newton, Dallas, TX (US); Robert Lee Ellis, Midlothian, TX (US)

(73) Assignee: Bayco Products, Ltd., Wylie, TX (US)

( * ) Notice: Subject to any disclaimer, the term of this patent is extended or adjusted under 35 U.S.C. 154(b) by 0 days.

(21) Appl. No.: 11/097,020

(22) Filed: Apr. 1, 2005

(65) Prior Publication Data

US 2006/0220569 A1    Oct. 5, 2006

(51) Int. Cl.
*H05B 37/00* (2006.01)
*F21K 27/00* (2006.01)
*H01J 5/48* (2006.01)

(52) U.S. Cl. .................. 315/324; 315/59; 315/312; 315/56; 315/224; 313/318.1; 313/317; 313/318.02; 362/260; 362/220

(58) Field of Classification Search ................ 315/324, 315/312, 56–59, 224, 225; 362/260, 220; 313/318.1, 318.02, 317
See application file for complete search history.

(56) References Cited

U.S. PATENT DOCUMENTS

| | | | | |
|---|---|---|---|---|
| 5,416,685 A | * | 5/1995 | Myers | 362/398 |
| 5,803,588 A | * | 9/1998 | Costa | 362/223 |
| 6,307,316 B1 | * | 10/2001 | Holzer | 313/493 |
| 6,534,926 B1 | | 3/2003 | Miller et al. | 315/224 |
| 6,577,066 B1 | * | 6/2003 | Kominami et al. | 315/58 |

* cited by examiner

*Primary Examiner*—Tuyet Thi Vo
(74) *Attorney, Agent, or Firm*—Whitaker, Chalk, Swindle & Sawyer, LLP; Stephen S. Mosher

(57) ABSTRACT

An electronic ballast circuit for a handheld fluorescent task lamp, comprising a self-starting electronic driver circuit operated by a power supply and operable to start and run at least first and second compact fluorescent bulbs from a single output; first and second receptacles for connecting the first and second bulbs to the single output; and a bulb accommodation circuit in the electronic driver circuit that enables operation of the electronic ballast circuit with either starter or non-starter type fluorescent bulbs and with either one or both bulbs.

10 Claims, 8 Drawing Sheets

ELECTRONIC BALLAST FOR A FLUORESCENT TASK LAMP

CROSS REFERENCE TO RELATED APPLICATIONS

This patent application is related to U.S. patent application Ser. No. 10/836,482, filed Apr. 20, 2004 now U.S. Pat. No. 7,049,762 and entitled "Portable Fluorescent Task Lamp.

BACKGROUND OF THE INVENTION

1. Field of the Invention

The present invention generally relates to handheld lighting units and more particularly to handheld fluorescent lighting units having an improved electronic ballast, enhanced forward illumination, resistance to mechanical impact, and accommodation of one or more of various types of fluorescent bulbs.

2. Description of the Prior Art

Portable, hand-held drop lights or task lamps utilizing an incandescent bulb and powered by AC line current, typically 120 Volts AC, 60 Hz, allow the user to provide light where installed light fixtures do not provide adequate coverage. However, incandescent bulbs as the light source in task lamps have several disadvantages. It is well known that incandescent light bulbs are not economical to operate because much of the electrical energy used by the task light is converted to heat. The tungsten filament in a typical 100 Watt incandescent bulb causes the bulb to get too hot to touch, or even use close to one's person. Moreover, the relatively fragile nature of the tungsten filament impairs the utility of a task lamp in many work situations.

One alternative to the use of incandescent bulbs is the fluorescent bulb. Fluorescent bulbs convert more of the supplied electrical energy to light energy and radiate much less heat than do incandescent lights. The light emitting medium in fluorescent lights is a phosphor coating, unlike the thin, fragile tungsten filament in an incandescent light bulb. In a fluorescent lamp bulb, a glass tube containing a small amount of gas—mercury vapor, for example—is provided with coated cathode electrodes at either end of the tube. When a high enough voltage is applied between each pair of electrodes at the ends of the glass tube, the coated filament is heated and emits electrons into the gas inside the tube. The gas becomes partially ionized and undergoes a phase change to a plasma state. The plasma is conductive and permits an electric arc to be established between the electrodes. As current flows in the plasma, electrons collide with gas molecules, boosting the electrons to a higher energy level. This higher energy level is not a stable condition and when the electron falls back to its normal energy level, a photon of ultra-violet light is emitted. The photons in turn collide with the phosphor coating on the inside of the glass tube, imparting their energy to the phosphor ions, causing them to glow in the visible spectrum. Thus the phosphor coating luminesces and gives off the characteristic "fluorescent" light.

However, fluorescent bulbs require a relatively high voltage to initiate the plasma state. After the plasma state is initiated, i.e., the bulb is ignited, the effective resistance of the plasma between the electrodes drops due to the negative resistance characteristic of the fluorescent bulb. Unless the current is limited after ignition of the bulb, the tube will draw excessive current and damage itself and/or the supply circuit. The dual functions of igniting the fluorescent bulb and limiting the current in the bulb after ignition takes place are performed by a ballast circuit. The ballast for full-sized installed light fixtures includes a large transformer/inductor, to transform the supplied line voltage, typically 120 Volts AC available at a wall outlet to a high enough potential to ignite the lamp and also to provide a high enough inductive impedance in the supply circuit to limit the current during operation. For typical installed lighting fixtures using non-self-starting bulbs and operating at 120 VAC, 60 Hz, the wire gauge, the number of turns in the coils, and size of the magnetic core result in a large and heavy ballast component. The ballast circuits for so-called "self-starting" fluorescent bulbs are typically smaller, yet still provide an appropriate voltage to ignite the lamps without a separate starter. The inductive impedance of the ballast circuit then regulates the current draw in a similar manner to that previously described for non-self starting bulbs.

In recent years electronic ballast circuits have been developed to replace the large inductors used in the traditional fluorescent lamp ballasts. The electronic ballasts are much lighter in weight because they operate at much higher frequencies and thus have much smaller inductive components. Such "solid state" ballasts are also very efficient and can be manufactured at low cost, making them especially suited for use in small, handheld fluorescent lamps. In one example of the prior art, U.S. Pat. No. 6,534,926, Miller et al., a portable fluorescent drop light is disclosed that contains a pair of twin-tube compact fluorescent lamp (CFL) bulbs that are individually switched. The discrete solid state drive circuit used as a ballast for non-self-starting bulbs utilizes the CFL bulbs as part of the oscillating circuit and has a relatively high component count. A different ballast circuit is required for use with self-starting bulbs. Miller et al. thus has the disadvantages of relatively high component count, and is not capable of driving non-self-starting or self-starting bulbs from the same ballast circuit. Further, while the output from the two 13 Watt CFL bulbs provides adequate illumination, the diffuse light is radiated into all directions and is not controlled or directed in any way so as to maximize the utility of the illumination for task lighting. The portable fluorescent lamp disclosed by Miller et al. further appears to lack the ability to withstand mechanical impacts that frequently occur during the use of task lamps.

A need exists, therefore, for an economical, portable hand-held task lamp that provides a light output substantially equivalent to that of a 100 Watt incandescent bulb, is efficient to operate, and does not operate at excessively high temperatures. A need also exists for a cool-running, efficient task lamp that provides an enhanced illumination output, directing the available light toward the task being illuminated. A need also exists for a ballast circuit design that can accommodate and operate with either self-starting or non-self-starting bulbs, can start and run whether one or both bulbs are installed in the task lamp, and does not require separate switches or separate circuits to operate two or more bulbs. The lamp should further be resistant to damage from mechanical impact and utilize inexpensive, readily available fluorescent bulbs. It would be a further desirable feature to provide as light-weight and compact a task lamp as possible.

SUMMARY OF THE INVENTION

Accordingly there is disclosed an electronic ballast circuit for a handheld fluorescent task lamp, comprising a power supply controlled by an ON/OFF switch; a self-starting electronic driver circuit operated by the power supply and operable to start and run at least first and second CFL bulbs from a single output; first and second receptacles for connecting the first and second CFL bulbs to the single output of the driver circuit; and a bulb accommodation circuit in the electronic driver circuit that enables operation of the electronic ballast circuit with either starter or non-starter type fluorescent bulbs and with either one or both bulbs.

DETAILED DESCRIPTION OF THE INVENTION

Figure 1:
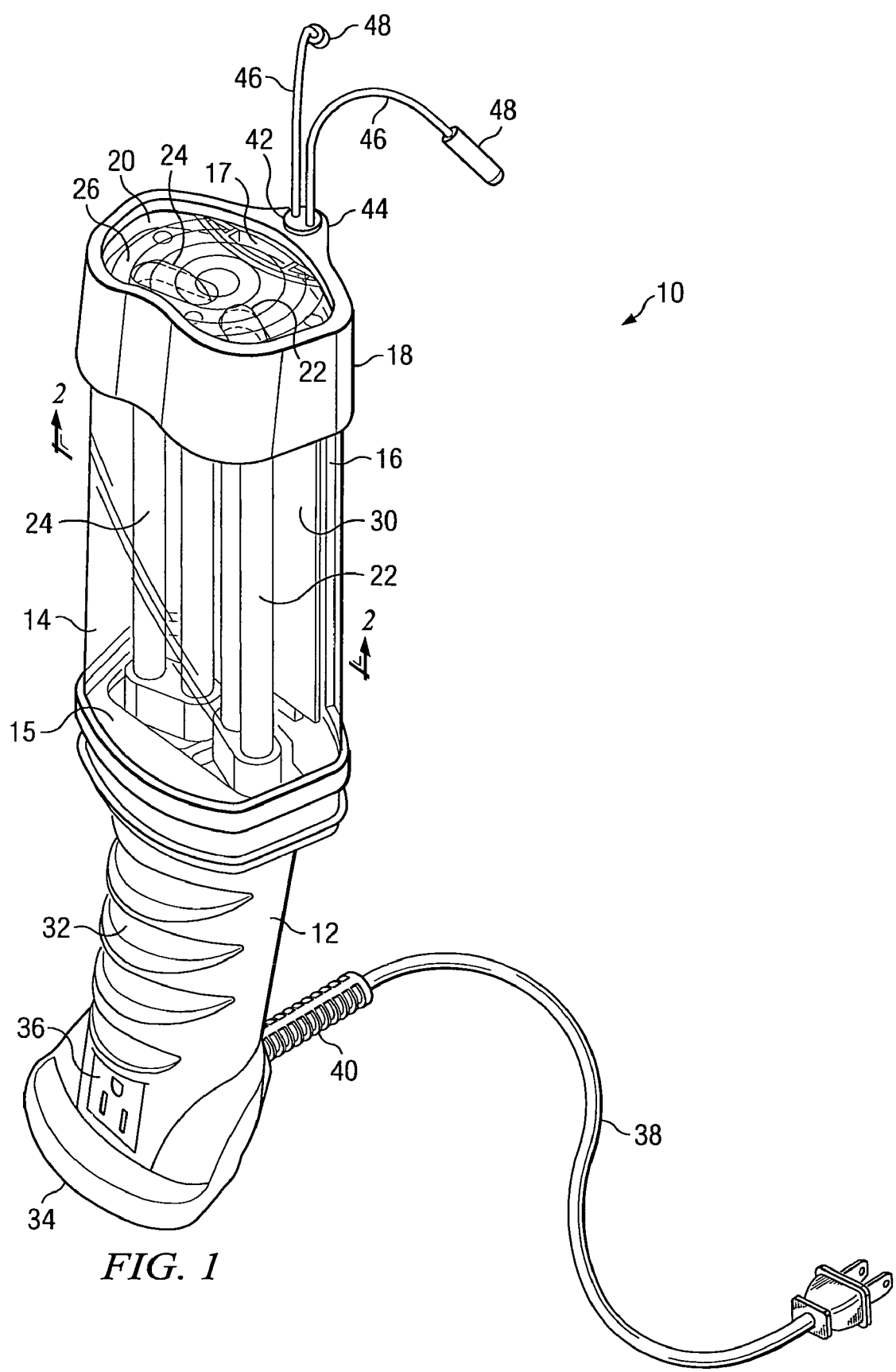
FIG. 1 illustrates a pictorial perspective view of a fluorescent task lamp according to one embodiment of the present invention.

In the following description, structures bearing the same reference numbers in the various figures are alike. Referring to FIG. 1 there is illustrated a pictorial perspective view of a fluorescent task lamp 10 according to one embodiment of the present invention, as viewed from a perspective above and to the left side of the task lamp 10. The illustrative task lamp 10 is designed to be conveniently held in a user's hand or supported by built-in, adjustable hooks, and is approximately 13 inches in length, excluding the extendable hooks and the line cord. The task lamp 10 includes a housing 12, a clear lens body 14, an elongated spine 16 extending upward from the open end of the housing 12, and a flexible cap 18 that fits over the combination of the upper, closed end 20 of the lens body 14 and the distal end 17 of the elongated spine 16. The distal end 17 of the elongated spine 16 is barely visible in FIG. 1 through the closed end 20, but see also FIGS. 7 and 8. Further, the close observer will note that the elongated spine 16 is disposed relative to the housing 12 at an inclination angle of approximately nine (9) degrees between the longitudinal axes of the housing 12 and the elongated spine 16. This inclination angle may be selected as a nominal forward-leaning angle for task illumination when the task lamp is placed in an upright position on a work surface. Other inclination angles, generally in the range of zero to twenty degrees may, of course, be used. The inclination angle of the illustrative embodiment described herein is also clearly shown in FIG. 8.

The housing 12 of the fluorescent task lamp 10 is generally tubular, being hollow to accommodate electronic circuitry as will be described. The lens body 14 is supported within the open end 15 of the housing 12. Enclosed within the clear lens body 14 are first 22 and second 24 compact fluorescent lamp (CFL) bulbs, supported in a receptacle to be described herein below. The first and second CFL bulbs 22, 24 are supported at their upper ends within openings cut through a soft, resilient bulkhead 26 to provide resistance to mechanical shock or impact. A reflector 30, disposed behind the first and second CFL bulbs 22, 24, is attached to a bulb side surface of a reflector panel 58 (See FIG. 2). The reflector panel 58 may be an integral part of the lens body 14 or a separate structure installed therein. The reflector 30 is configured to reflect light emitted by the first and second CFL bulbs 22, 24 in a forward direction to augment the forward emission of light from the first and second CFL bulbs 22, 24. It will also be noted that the first and second CFL bulbs 22, 24 are oriented at an angle with respect to each other. Positioning the first and second CFL bulbs 22, 24 such they are turned slightly inward toward each other provides as an unexpected benefit a much enhanced forward emission field as will be described in detail herein below.

Continuing with FIG. 1, the housing 12 includes a finger grip 32 having a plurality of finger recesses formed in a frontward portion thereof. At the lower end of the housing 12 is formed an integral stand or base 34 for use when it is desired to stand the task lamp 10 in an upright position. The base 34, as will be shown in a subsequent figure, is generally flat to facilitate the upright position of the task lamp 10. A three terminal AC outlet 36 or "tool tap" is provided in the lower portion of the housing 12 for connecting AC operated tools or other devices. Alternate embodiments may utilize a two terminal AC outlet for use with two-wire AC circuits, although three-wire outlets are preferred for safety reasons. Power is supplied to the task lamp 10 by the line cord 38 that is supported in the lower, rear portion of the housing 12 by a strain relief 40. The cord may preferably be a three wire cord having line, neutral and ground conductors, although that is not essential for the present invention. As will be explained, the strain relief 40 is formed of pliable material and the entire strain relief pivots about a fixed point in the housing 12.

In an upper portion of the rear of the housing 12 a pair of spring wire hooks 46 are provided to support the task lamp 10 in variety of positions during use. The hooks 46 are attached to the upper end of a rod 42, which slides upward and downward within a rearward portion of the elongated spine 16 and extends through the cap 18. The lower end (not shown) of the rod 42 includes an expanded portion or knob that resists movement within the rearward portion of the cap 18, to facilitate retaining the hooks 46 in an adjusted position. The hooks 46 may be fabricated of metal spring wire and equipped with nylon tips 48 to prevent marring of a surface upon which the hooks 46 are placed. The wire gauge selected can be used to advantage. For example, if a smaller gauge, such as 20 gauge is selected, one or both of the wire hooks 46 may be bent to enable hanging the task lamp 10 from the edge of a flat surface, for example. The nylon tips 48 prevent the flat surface from being marred. Although a larger gauge, such as 18 gauge or 16 gauge spring wire may be used, the hooks 46 are not as easily bent to provide this increased utility available when a smaller gauge spring wire is used.

Several materials are recommended for the structures in the fluorescent task lamp of the present invention. The housing 12 is preferably molded of a polypropylene formulated to provide a slight amount of resilience to better distribute the shock of impact as when the task lamp 10 is dropped. In one embodiment, the elongated spine 16 and the housing 12 are molded as a single integrated component, configured as mirror halves to each other. This integrated construction provides strength to the combined structures and improved distribution of impact forces throughout the housing component. The polypropylene material is also available in a variety of colors. For example, the illustrated embodiment may be yellow or orange for safety recognition, or produced in any of a variety of other colors. The clear lens body 14, which completely surrounds the first and second CFL bulbs 22, 24 (See, e.g., FIG. 7 infra), is preferably molded of glycol-modified polyethylene terephthalate (PETG) or polyvinyl chloride (PVC). These materials are very tough and provide good optical properties as well. The cap 18, which functions as a "bumper" when the task lamp 10 is dropped or bumped against another object, may be molded of vinyl rubber, selected for the characteristics of flexibility and resilience. As will be described in FIG. 7, the inside surfaces of the cap 18 include small rib-like features that retain the cap in place when pressed over the combination of the lens body 14 and the elongated spine 16. The resilience of the cap 18, as noted above, also provides some resistance to mechanical shock.

Another mechanical impact resisting component shown in FIG. 1 is the soft, resilient bulkhead 26, which is visible in the drawing just inside the upper end of the clear lens body 14. This bulkhead may be molded of a plastic material or of a mixture of plastics processed from recycled polymer residues of various molding operations. It should be a moldable, resilient material having approximately a 20 Shore A durometer specification, within a range of +/−10 Shore A durometer. The durometer specification selected depends on the expected impact forces and the dimensions of the bulkhead itself and the configuration of the bulkhead, i.e., whether openings or voids are included in or distributed within the body of the bulkhead. The result of the above combination of features and materials provides an impact absorbing housing design that resists damage to both the task lamp and the relatively fragile fluorescent bulbs contained within the lamp caused by mechanical shock. The total effect of the design of and the materials selected for the entire housing assembly of the task lamp 10, including the housing 12, the lens body 14, the elongated spine 16, the cap 18 and the flexible bulkhead 26 is to enable the task lamp of the present invention to withstand repeated drops from a distance of up to six feet without bulb breakage.

The post 42 (only the upper end of the post 42 is visible in FIG. 1) that supports the hooks 46 may be formed of polypropylene, while the protective tips 48 may be formed of nylon. The hooks 46 themselves may be formed of 20 gauge steel spring wire. The strain relief 40 may be molded of PVC. The flexibility of the strain relief is provided primarily by its ribbed profile. The reflector 30 may be fabricated of aluminized mylar applied to a paper backing and attached to the bulb-side surface of the reflector panel 58 using an adhesive (not shown) or one or more strips of double-sided tape (also not shown). In the illustrated embodiment, the receptacles for supporting the first and second CFL bulbs 22, 24, as will be described infra, are combined into a single body molded of polychloride, selected for its strength and insulating qualities.

Figures 2, 3:
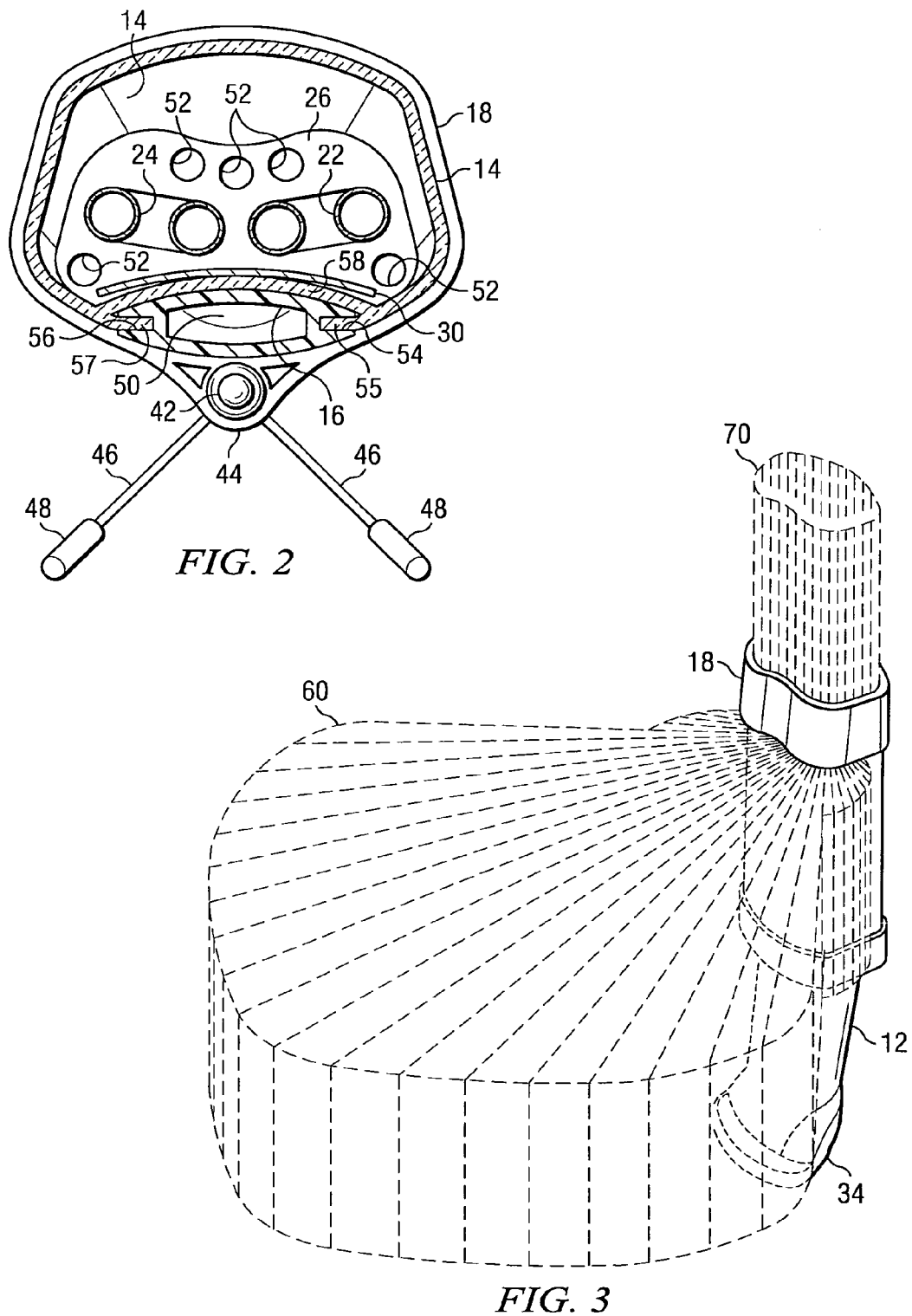
FIG. 2 illustrates a cross section view through the light producing portion of the embodiment of FIG. 1.
FIG. 3 illustrates a pictorial perspective view of the enhanced forward emission field and the spotlight emission field produced by the fluorescent task lamp according to the embodiment of FIG. 1.

Referring to FIG. 2 there is illustrated a cross section view through the light producing portion of the embodiment of FIG. 1, as viewed in an upward direction toward the cap 18. Shown in FIG. 2 are the lens body 14, the elongated spine 16, and the reflector 30, all shown in cross section. Also visible in FIG. 2 is the relationship between the elongated spine 16 and the lens body 14, which are nested together. The lens body 14 includes a reflector panel 58, which includes first and second tracks or rails 55, 57 that slide along first and second grooves 54, 56 formed in the edges of the elongated spine 16. The elongated spine 16 further includes a hollow interior 50, which may accommodate electrical circuitry or support an additional light source such as a point source light emitting diode (LED). Other uses of the hollow interior space 50 are described in the detailed description of FIG. 8 infra. Beyond and upward from the cross section (into the plane of the page) are shown the resilient bulkhead 26, the cap 18, and the hooks 46. The lower end of the hook post 42 is shown, which slides or rotates within a bore formed in the cap 18. The first and second CFL bulbs 22, 24 are shown in cross section.

It will be appreciated that the first and second CFL bulbs 22, 24 are so-called "twin tube" bulbs in the illustrated embodiment. The first and second CFL bulbs, in the embodiment shown may preferably be 9 Watt rated, have a color temperature of 6500 degrees K., and are provided with a GX23 bi-pin base, wherein both ends of the CFL bulb tube are terminated in a single base structure that is configured to be conveniently plugged into a receptacle. Other color temperatures may be used without changing the advantages provided by the present invention. Other bases than the GX23 may, of course be used, as long as they permit the bulb alignments required by the configuration disclosed herein. As will be further be appreciated from FIG. 7, to be described, the lens body 14 is configured with a slight taper, having a smaller cross section toward the upper, closed end of the lens body 14. Further, the resilient bulkhead 26 may include several openings 52 to modify the resiliency or to conserve material. In the view provided by FIG. 2, the resilient bulkhead 26 is pushed into a position near the upper, inside, closed end of the lens body 14. The resilient bulkhead 26 is intended to be positioned where its cross section substantially matches that of the inside of the lens body 14. Another purpose of the resilient bulkhead 26 is to maintain the first and second CFL bulbs 22, 24 in the correct alignment and spacing to ensure production of the enhanced forward emission field.

Referring to FIG. 3 there is illustrated a pictorial perspective view of the enhanced forward emission field and the spotlight emission field produced by the fluorescent task lamp according to the embodiment of FIG. 1. Visible in the illustration are the housing 12 of the task lamp 10, having a base 34 and a cap 18 as previously described. Projecting principally into the forward direction, and partially to either side, is the main portion of the forward emission field 60 of the light output from the diffuse fluorescent source within the lens body 14 of the task lamp 10. Also shown is a spotlight emission field—substantially beam like—emitted from the end of the task lamp through the opening in the cap 18. The emission fields 60, 70 are somewhat idealized to demonstrate the effects of the novel configuration of components incorporated into the design of the task lamp of the illustrative embodiment.

Figure 4A:
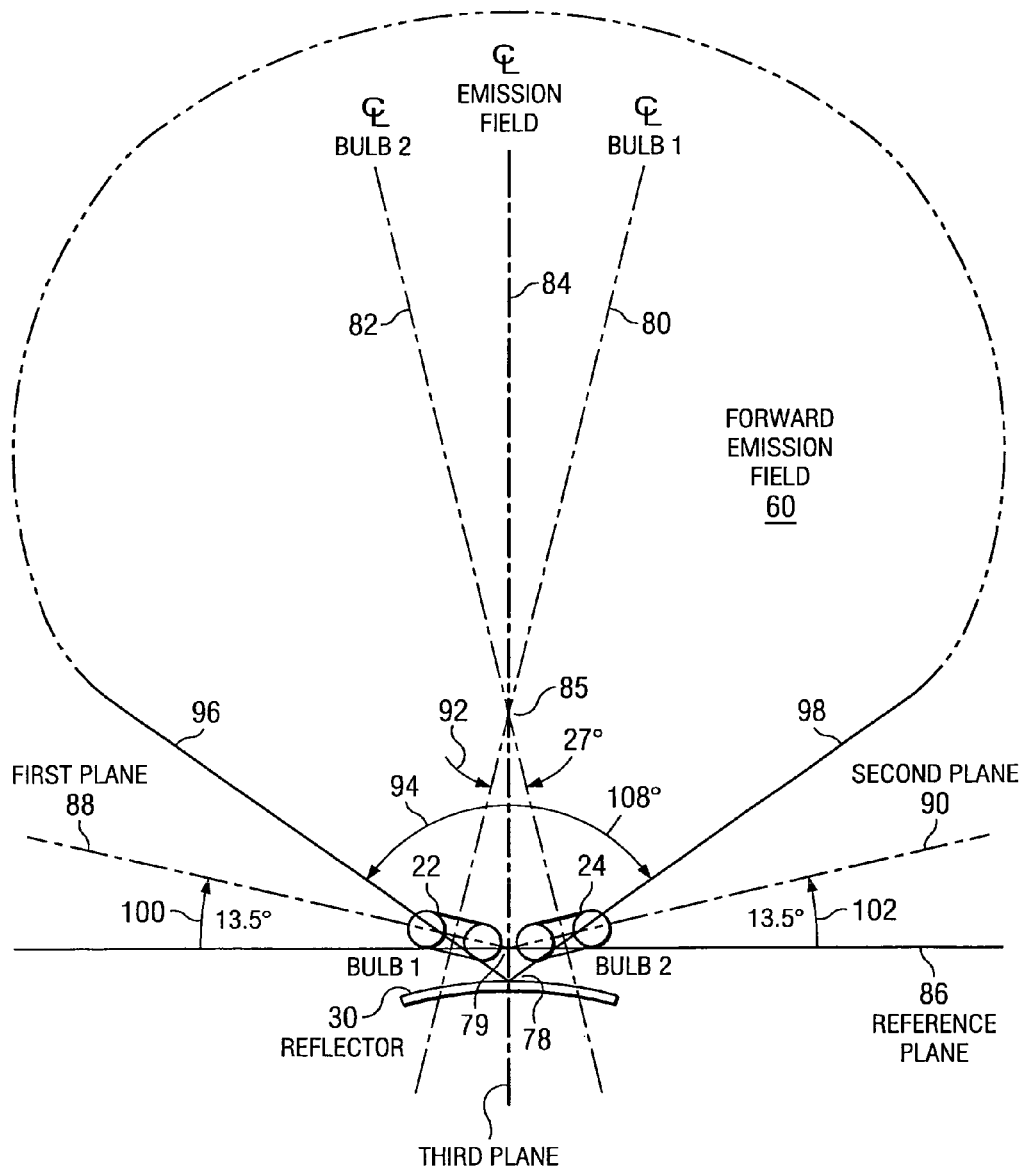
FIG. 4A illustrates a plan view of how the enhanced forward emission field is produced by the fluorescent task lamp according to the embodiment of FIG. 1.

Referring to FIG. 4A there is illustrated a plan view of how the enhanced forward emission field is produced by the fluorescent task lamp according to the embodiment of FIG. 1. The view is as if one were looking down at the top of the task lamp with the cap 18, the resilient bulkhead 26 and the lens body 14 removed, exposing the upper ends of the first and second CFL bulbs 22, 24. The first and second CFL bulbs 22, 24, and the reflector 30 are shown, along with a first reference point 78 located in the center of the reflecting surface of the reflector 30. The first reference point 78 is also on a line that extends forward from and is normal to the reflector 30 at the first reference point 78. This line is a line of symmetry that bisects the forward emission field produced by the first and second CFL bulbs 22, 24, one bulb on each side of and equally spaced from and oriented identically with this line of symmetry. This line of symmetry is called the centerline 84 of the forward emission field, alternately called the FEF centerline 84, and is shown by a broken line in FIG. 4A.

Continuing with FIG. 4A, a reference plane 86 is defined that is normal to both the FEF centerline 84 and the plane of the drawing. The reference plane 86 is thus approximately parallel to the plane of the reflector 30 at the first reference point 78. The FEF centerline 84 intersects the reference plane 86 at a second reference point 79. The first CFL bulb 22 is shown positioned to the left of the FEF centerline 84, with the twin tubes of the first CFL bulb 22 aligned at an angle 100 with respect to the reference plane 86. This angle is preferably approximately 13.5 degrees, which is also the angle of the first plane 88 with respect to the reference plane 86. A "bulb one" centerline 80 is shown normal to the first plane 88 and extending forward into the forward emission field 60, crossing the FEF centerline 84 at a third reference point 85 at an angle equal to the angle 100 of approximately 13.5 degrees. Similarly, The second CFL bulb 24 is shown positioned to the right of the FEF centerline 84, with the twin tubes of the second CFL bulb 24 aligned at an angle 102 with respect to the reference plane 86. This angle is also preferably approximately 13.5 degrees, which is also the angle of the second plane 90 with respect to the reference plane 86. A "bulb two" centerline 82 is shown normal to the first plane 88 and extending forward into the forward emission field 60, crossing the FEF centerline 84 at the third reference point 85 at an angle equal to the angle 102 of approximately 13.5 degrees. The alignment angle 92 between the bulb one centerline 80 and the bulb two centerline 82 is approximately 27 degrees. It will also be understood that the angle between the first and second CFL bulbs, which is the forward angle between the first plane 88 and the second plane 90, is approximately 180−27=153 degrees.

This arrangement of the first 22 and second 24 twin tube CFL bulbs with respect to the reflector 30 has been found to yield unexpected and optimum results for producing a maximum forward emission field from a pair of CFL bulbs. It is well known that a fluorescent bulb emits a diffuse light that is difficult to control or concentrate directionally. In spite of the use of reflectors, the light is still very diffuse. However, the arrangement detailed above and illustrated in FIG. 4A is found to produce a maximum forward emission field that is particularly well adapted to work light or task light applications. The forward emission filed 60 concentrates most of the light emitted from the first and second CFL bulbs 22, 24 within an angle bounded by the first boundary 96 and the second boundary 98. The first and second boundaries 96, 98 represent boundary planes that are normal to the plane of the drawing and intersect at the reference point 78 on the reflecting surface of the reflector 30 at an emission angle 94 of approximately 108 degrees. This emission angle 94, which corresponds to the effective beam width of the forward emission field 60, is bisected by the FEF centerline 84. Moreover, the emission angle 94, which is approximately 108 degrees, is an integral multiple of the alignment angle 92 between the first and second CFL bulb centerlines 80, 82, which is approximately 27 degrees. To say it another way, the alignment angle 92 between the CFL bulb centerlines 80, 82 is approximately equal to one quarter of the beam width (i.e., the emission angle 94) of the forward emission field 60. This empirical relationship enables designers of illumination products to optimize the emission of light from diffuse sources while also maximizing the energy efficiency of the lighting apparatus employed to produce the emission field.

In the foregoing description of FIG. 4A, the reflector 30 is shown having a profile that is cylindrical, about a longitudinal axis that is substantially parallel to the longitudinal axes of the first and second CFL bulbs 22, 24, and has a proportionately large cylindrical or circular radius of curvature. In some applications, including the illustrative embodiment, this radius of curvature is very large, resulting in a reflector 30 that is nearly or substantially flat. However, the curvature of the reflector 30 may be concave or convex with respect to the forward emission field 60 and may be formed to a variety of shapes including circles or spheres, conic sections, or faceted profiles. A faceted reflector may be formed from a plurality of small reflecting elements to achieve a particular reflection profile or characteristic suited to a particular application. In general, the choice of profile will depend strongly on the spacings between the CFL bulbs and between the CFL bulbs and the reflector. The reflector 30 has less effect on the forward emission field in the illustrated embodiment because it quite close to the first and second CFL bulbs 22, 24. It will be observed by the careful reader that a substantial portion of the light reflected from a closely spaced reflector, as illustrated in FIG. 4A, is blocked from the forward emission field by the bulbs themselves because of their close spacing and their closeness to the reflector.

Figure 4B:
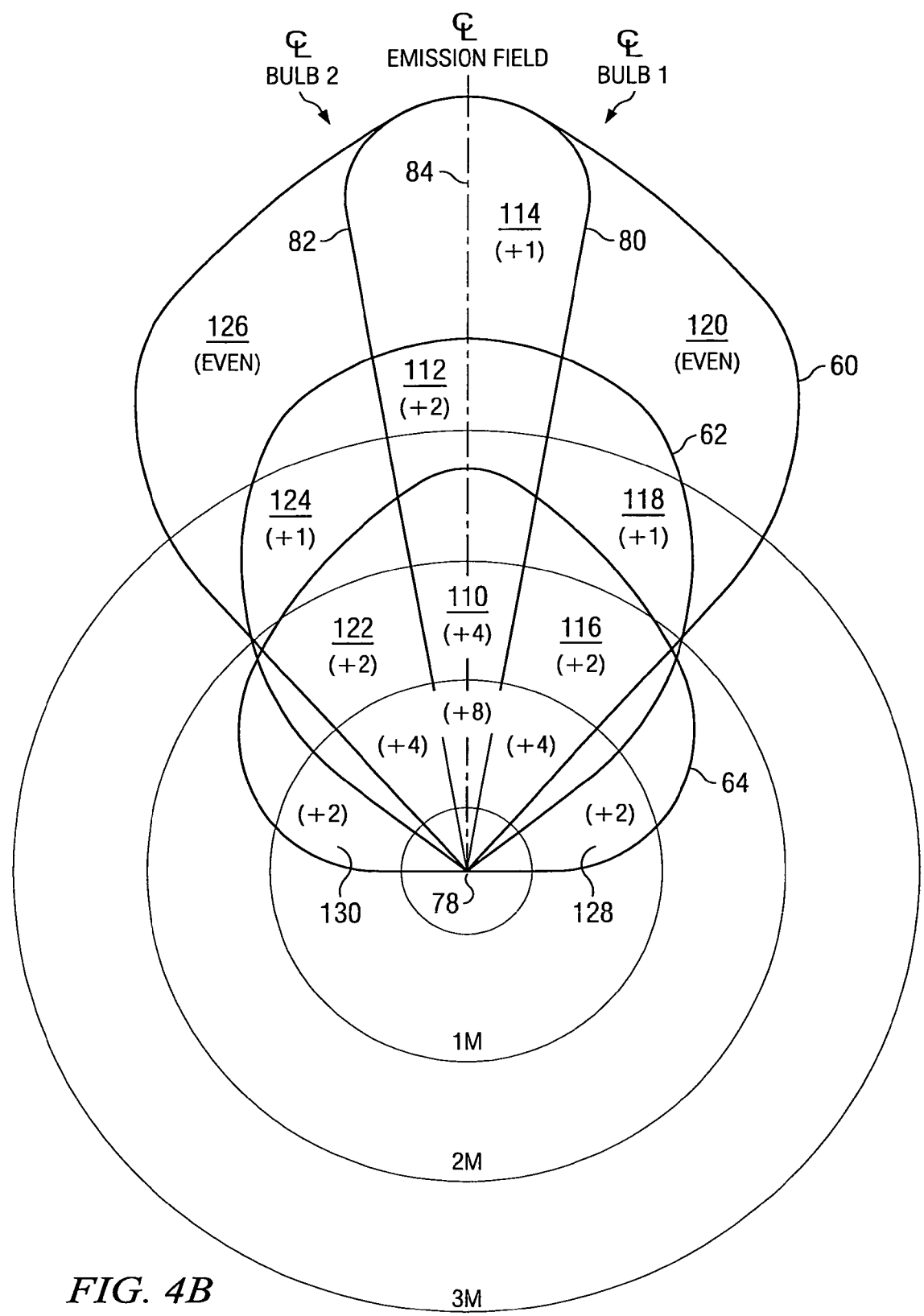
FIG. 4B illustrates a plan view showing the distribution of light in the forward emission field produced by the fluorescent task lamp according to the embodiment of FIG. 1.

Referring to FIG. 4B there is illustrated a plan view showing the polar distribution of light in the forward emission field produced by the fluorescent task lamp according to the embodiment of FIGS. 1 and 4A, wherein the first and second CFL bulbs 22, 24 are disposed at an angle such that their respective centerlines 80, 82 intersect at an angle of approximately 27 degrees, according to the "quarter beam width" principle described in the description of FIG. 4A. The distribution is shown for useful radii for a handheld task light, that is, for distances of zero up to four or five meters from the task lamp, with the most useful illumination occurring within the zero-to-three meter range. The drawing includes radii of one, two and three meters for reference. The perspective is similar to that of FIG. 4A, including the first reference point 78, the FEF centerline 84, and the CFL bulb one 80 and CFL bulb two 82 centerlines. The disposition of the first and second CFL bulbs 22, 24 at the quarter beam width angle of their centerlines and the use of a nearly flat or only slightly curved nearby reflector 30 behind them, while it optimizes or enhances the forward emission field 60, also produces regions within the forward emission field having varying intensities of illumination. This characteristic is illustrated in FIG. 4B, and represents the additive illumination intensities in the various regions as compared with a pair of twin tube CFL bulbs of the same wattage rating spaced at the same distance side-by-side, but aligned, as in conventional fluorescent task lamps, in a straight line so that their respective centerlines are parallel.

For example, there are three overlapping forward emission fields illustrated in FIG. 4B. In addition to the first forward emission field 60 that is defined and shown in FIG. 4B, i.e., that reaches out to well beyond three meters, there are a second forward emission field (FEF) 62 and a third FEF 64. Regions within these FEFs 60, 62, and 64 are identified with reference numbers. Regions 110, 112, and 114 are defined for the space within the FEF that lies between the planes corresponding to the CFL "bulb one" 80 and CFL "bulb two" centerlines. Similarly, regions 116, 118, and 120 are defined for the space to the right (in the drawing) of the CFL "bulb one" centerline 80, and regions 122, 124, and 126 are defined for the space to the left (in the drawing) of the CFL "bulb two" centerline 82. Within these regions identified with the reference numbers are integers that convey illumination intensity values relative to the value of a pair of twin tube CFL bulbs aligned in a straight-line, side-by-side relationship and emitting light into the space around it. The intensity values are expressed in the percentage gain in the luminous flux of the angular alignment of the two twin tube CFL bulbs as described herein as compared with the straight alignment configuration of conventional fluorescent task lamps.

Thus, in region 110, the relative improvement within one meter is +8%, within two meters is +4%, and within three meters is +2%. Similarly, in regions 116 and 122, the relative improvement within one meter is +4% and within two meters is +2%. The effects are cumulative throughout the entire forward emission field 60, and together sum to approximately 33 percent more illumination into the forward emission field than is provided by the conventional straight, side-by-side alignment of the twin tube CFL bulbs.

To appreciate the enhanced illumination into the forward emission field provided by the angular alignment of the first and second CFL bulbs of the present invention, consider the following comparison. These two 9 Watt CFL bulbs, in the configuration described in detail in the illustrated embodiment, nominally provide an 18 Watt fluorescent task lamp having an effective light output that approaches that of a 100 Watt incandescent task lamp. To see why, recall that in conventional fluorescent task lamps, two 13 Watt fluorescent bulbs are required to produce a light output approximately equivalent to a 100 Watt incandescent bulb, a standard comparison. This improvement can be represented by the factor obtained by dividing 100 Watts by 26 Watts, or, about 3.84. Now, multiply this factor 3.84 by 18 Watts, which yields a result of 69 Watts, the equivalent light produced by a pair of 9 Watt twin tube CFL bulbs arranged in a straight, side-by-side alignment, as found in conventional fluorescent task lamps. However, by re-aligning the two 9 Watt, twin tube CFL bulbs as in the present invention, a 69 Watt equivalent output increased by the 33% improvement described in the preceding paragraph becomes a 92 Watt equivalent illumination output. In other words, the forward emission field has been enhanced by 33 percent. This output is only eight percent below the "100 Watts" touted for the conventional 26 Watt fluorescent task lamp. Of course, this has been a comparison of electrical power required—the power ratings of the CFL bulbs—but the comparison is valid because the light outputs are proportional to the input power required, all other things being equal.

Figure 5:
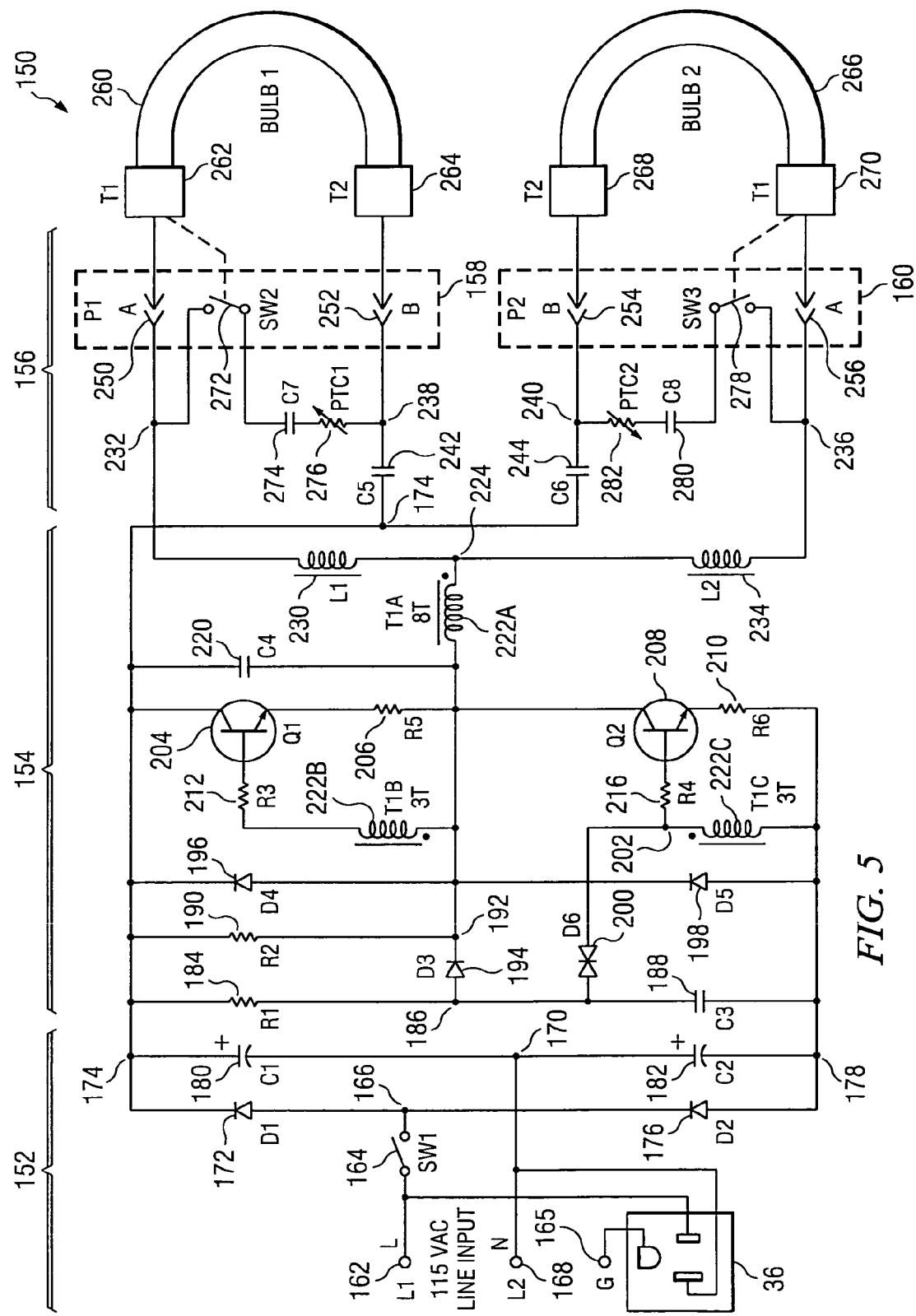
FIG. 5 illustrates an electrical schematic diagram of one embodiment of the electronic ballast circuit employed in the fluorescent task lamp according to the embodiment of FIG. 1.

Referring to FIG. 5 there is illustrated an electrical schematic diagram of one embodiment of the electronic ballast circuit employed in the fluorescent task lamp according to the embodiment of FIG. 1. The electronic ballast circuit 150 includes three functional sections, a power supply 152, a self starting electronic driver circuit 154, and a bulb accommodation circuit 156. The first and second CFL bulbs 22, 24 are connected to the bulb accommodation circuit 156 via the first and second receptacles 158 and 160. As will be described, the ballast circuit 150 operates at least two CFL bulbs in parallel from a ballast circuit controlled by a single switch, will start either starter-type or non-starter-type CFL bulbs, will operate with either one of the bulbs removed from the circuit, and will safely discontinue operation with the switch turned ON and either or both bulbs are removed from the circuit. The ballast circuit has a very low component count for low cost and minimum space requirements and is very efficient, resulting in minimum heat dissipation. Low heat dissipation is an important design constraint for electronic circuitry operating within a small, enclosed volume as in the housing 12 of the illustrative task lamp 10.

Continuing with the ballast circuit 150, a "line" power line conductor 162 connects via an ON/OFF switch 164 to a node 166 and further to a line side terminal of an AC receptacle or outlet 36. A "neutral" power line conductor 168 connects to a node 170 and further to a neutral side terminal of the AC receptacle or outlet 36. A ground line conductor 165 connects to a ground terminal of the AC receptacle or outlet 36. A diode rectifier 172 is connected between the node 166 (anode) and a node 174 (cathode). The node 174 is further identified as the positive DC supply voltage line or rail. A second diode rectifier 176 is connected between the node 166 (cathode) and a node 178 (anode). The node 178 is further identified as the negative DC supply voltage line or rail. Neither node 174 or 178 is connected to the ground line 165. A first filter capacitor 180 is connected between the nodes 174 and 170. A second filter capacitor 182 is connected between the nodes 170 and 178. The circuit configuration illustrated is a voltage doubler power supply 152, well known to persons skilled in the art. The nominal AC voltage input applied across the Line terminal 162 and Neutral terminal 168 is 120 Volts AC, 50/60 Hz. The nominal DC output voltage provided from the illustrative voltage doubler power supply 152 is approximately 320 Volts DC.

The self starting electronic driver circuit 154 shown in FIG. 5 will now be described. Connected between the nodes 174 and 178 are a resistor 184, a node 186 and a capacitor 188. Another resistor 190 is connected between the node 174 and a node 192. A diode 194 is connected between the nodes 192 (cathode) and 186 (anode). A first snubber diode 196 is connected between the node 174 (cathode) and 192 (anode). A second snubber diode 198 is connected between the node 192 (cathode) and the node 178 (anode). A first NPN transistor 204 and a second NPN transistor 208 are connected in totem pole fashion between the nod 174 and the node 178. The collector of transistor 204 is connected to the node 174 and the emitter of transistor 204 is connected through a resistor 206 to the node 192 and the collector of transistor 208. The emitter of transistor 208 is connected through a resistor 210 to the node 178. The base of transistor 204 is connected through a resistor 212 and a three turn winding 222B to the node 192, with the polarity mark of the winding 222B connected to the node 192. The base of transistor 208 is connected through a resistor 216 and another three turn winding 222C to the node 178, with the polarity mark of the winding 222C connected to the resistor 216. The connection of the resistor 216 and the marked end of the winding 222C define a node 202. The windings 222B and 222C are two of the three windings of a pulse transformer 222, wound on a toroid core. The node 202 is connected to the node 186 through a bilateral diode 200. The bilateral diode 200, in the illustrated embodiment, may be a type HT-32A available from Teccor Electronics Inc., Irving, Tex., or its equivalent. The bilateral diode 200 is rated at a nominal break-over voltage of 32 Volts and a maximum trigger current of 2 Amperes. The node 192 is a common node for the electronic driver circuit 154. Connected between the node 174 and the common node 192 is a capacitor 220. The third winding 222A of the pulse transformer 222 is connected between the common node 192 and an output node 224, with the polarity mark connected to the node 224.

The output of the electronic drive circuit 154 is a square wave operating at a frequency of approximately 32 KHz and a peak amplitude of approximately the 320 Volt rail-to-rail voltage produced by the voltage doubler power supply 152. When power is first applied to the circuit 154, the capacitor 188 charges through the resistor 184 until it exceeds the break-over potential of the bilateral "trigger" diode 200. Capacitor 188 then discharges through the bilateral diode 200 and resistor 216, driving the second NPN transistor 208 into saturation and pulling the common node 192 to very near the negative rail 178. The initial current for transistor 208 is supplied through capacitor 220. Once started, positive feedback via the transformer 222 windings in the respective base drive circuits of the first and second transistors 204, 208 alternately biases the respective transistor into and out of saturation, such that one transistor is conducting at a time, and allows the circuit to oscillate at a frequency determined by the characteristics of the load, to be described infra. Thus, once under way, the alternating current through the transformer winding 222A alternately biases the first 204 and the second 208 transistor into saturation until the polarity of the instantaneous voltage appearing at the common node 192 causes the respective transistor to come out of saturation. The diode 194 prevents the charge on capacitor 188 from exceeding the break-over potential of the bilateral diode 200 once the circuit has started. The resistor 190 acts as a bleeder resistor to discharge the capacitor 220 when power is removed from the circuit. The snubber diodes 196, 198 respectively protect the transistors 204, 208 from excessive reverse voltages that may occur in the circuit.

The bulb accommodation circuits 156 shown in FIG. 5 will now be described. It should be noted in the following description that the first and second CFL bulbs 22, 24 are also designated as the first and second CFL bulbs 260, 262, and may also be designated as CFL "bulb one" or CFL "bulb two." As mentioned in the preceding paragraph, the operating frequency of the electronic driver circuit 154 is determined by the characteristics of the load. The load in the illustrative embodiment includes the first and second CFL bulbs 260, 262 and their respective portions of the bulb accommodation circuit. The two CFL bulb accommodation circuit portions (hereinafter, circuits) are connected in parallel between the output node 224 of the electronic drive circuit and the positive rail 174 of the supply voltage and each CFL bulb circuit is identical within the normal tolerances of the components utilized. Both CFL bulb accommodation circuits operate the same way and at the same time. Further, each CFL bulb accommodation circuit may operate independently; that is, either bulb accommodation circuit may operate alone or together with the other bulb accommodation circuit. Moreover, three or more such bulb accommodation circuits may be driven together by the electronic driver circuit as long as the current capability of the electronic driver circuit is sufficiently scaled to provide the necessary current.

In the bulb accommodation circuit 156 of "bulb one" 260, an inductor 230 is connected between the node 224 and a node 232. A capacitor 242 is connected between the node 174 and a node 238. Connected in series between the node 232 and node 238 are, in turn, a SPST switch 272, a capacitor 274 and a resettable fuse 276. Also connected between the nodes 232 and 238 are the first 250 and second 252 terminals of a first CFL bulb receptacle 158. Connected to the first 250 and second 252 terminals of the first receptacle 158 are the first and second terminals 262, 264 of the first CFL bulb (also denoted "bulb one") 260. When the first CFL bulb 260 is connected to the first receptacle 158, the normally open contacts of switch 272 close. When the first CFL bulb is removed from the first receptacle 158, the contacts of the switch open the series circuit connected between the first and second terminals of the first receptacle 158.

Similarly, in the bulb accommodation circuit 156 of "bulb two" 266, an inductor 234 is connected between the node 224 and a node 236. A capacitor 244 is connected between the node 174 and a node 240. Connected in series between the node 236 and node 240 are, in turn, a SPST switch 278, a capacitor 280 and a resettable fuse 282. Also connected between the nodes 236 and 240 are the first 256 and second 254 terminals of a second CFL bulb receptacle 160. Connected to the first 256 and second 254 terminals of the second receptacle 160 are the first and second terminals 268, 270 of the second CFL bulb (also denoted "bulb two") 266. When the second CFL bulb 266 is connected to the second receptacle 160, the normally open contacts of switch 278 close. When the second CFL bulb is removed from the second receptacle 160, the contacts of the switch open the series circuit connected between the first and second terminals of the second receptacle 160.

In the illustrative embodiment, the value of the inductors, 230, 234 is approximately 6.7 milliHenrys. The value of the blocking capacitors 242, 244 is approximately 0.022 uF. The value of the bypass capacitors 274, 280 is approximately 0.0015 uF. Further, the SPST, normally open switch 272, 278 may be a micro switch mounted just below the receptacles 158, 160. Alternately, the switches 272, 278 may be especially formed of beryllium-copper spring stock and configured for being mounted within the body of the receptacles 158, 160.

The bulb accommodation circuits 156 are configured to accommodate the characteristics of both non-starter type CFL bulbs and starter type CFL bulbs. As is well known, non-starter type CFL bulbs contain an internal circuit connected between the two pins (terminals T1 and T2) in the base of the bulb. From one pin to the other is connected, in turn, a resistive filament (somewhat like a heater), a capacitor having a nominal value of approximately 3.0 nF (i.e., 3.0 nanoFarads or 0.003 microFarads or 0.003 uF), and another filament. Starter type CFL bulbs are similar except that they include a small neon lamp connected in parallel with the 3.0 nF capacitor inside the base of the CFL bulb.

Starting of the electronic ballast circuit 150 operates as follows. Since both bulb accommodation circuits 156 are the same, and they are started and driven by a single self starting electronic driver circuit 154, they are started by the same mechanism. Therefore the starting operation (which applies to either or both CFL bulb 260 and CFL bulb 262) for the first CFL bulb will be described. A non-starter CFL bulb 260 is started or "fired" by the resonant circuit formed by the inductor 230 and the internal capacitance of the first CFL bulb 260 (in combination with the blocking capacitor 242 and the bypass capacitor 274, though the effect of these capacitors, because of their values, is to reduce the operating frequency only slightly—on the order of approximately 10 percent), which presents a series resonant load to the output of the electronic driver circuit 154. The series resonant load is a very low impedance, and draws maximum current. As the circuit oscillates, in resonance, the voltage across the internal bulb capacitance increases until the firing voltage of the bulb is reached (approximately 250 to 300 Volts AC). After the bulb fires, the forward voltage drop across the bulb is maintained by the bulb characteristics at approximately 60 to 70 Volts AC, while the current through the bulb is limited by the inductive reactance of the inductor 230.

A starter type CFL bulb operates differently. Since the starter type CFL bulb includes a neon lamp inside the base of the bulb and connected in parallel with the internal capacitor of the bulb, the voltage across the bulb terminals is limited by the neon lamp's firing voltage to approximately 90 Volts AC. In other words, the current flows in the neon circuit path, effectively bypassing the internal capacitor of the CFL bulb. To counter this effect, the bypass capacitor 274 provides an alternate resonant path consisting of the inductor 230 and the bypass capacitor 274, which enables the voltage to reach sufficient firing voltage for the CFL bulb at a slightly higher frequency than when the inductor resonates with the internal capacitance of the CFL bulb alone. The voltage increases across the bypass capacitor 274 and provides current through the bulb filaments until the breakover or firing voltage of the bulb is exceeded. At that point the bulb fires and the operating frequency shifts back to its nominal operating value of approximately 32 Khz.

In operation, once the circuit has started, the electronic ballast circuit produces an oscillating square wave voltage across each of the first and second CFL bulbs 260, 266, and a corresponding oscillating current in each of the bulbs 260, 266. The frequency of the oscillation is determined by the values of the inductance of the inductor 230 or 234 and the series combination of the capacitor 242 or 244 and the internal capacitance of the CFL bulb, in parallel with the bypass capacitor 274 or 280. In the illustrated embodiment, the frequency is approximately 32 Khz. If a CFL bulb burns out, in effect removing that bulb's internal 3 nF capacitor from the circuit, the frequency would tend to rise to approximately 52 Khz were it not for the resettable fuse, which limits the drive current to a value insufficient to sustain oscillation in the disabled bulb circuit. When the defective bulb is removed, the lamp may continue operation with the other bulb, with no harm to the non-operating bulb accommodation circuit.

The CFL bulb characteristics are accommodated as follows. The purpose of the capacitors 242 and 244 is to block direct current flow in the respective CFL bulb 260, 266, enabling only alternating current to flow through the bulb. The purpose of the capacitors 274 and 280 is to enable the electronic driver circuit 154 to start when starter type CFL bulbs are used in the task lamp, as described supra. However, if a bulb 260, 266 burns out, the respective bypass capacitor 274, 280 in the circuit may permit the current in the lamp to build to an excessive level when it resonates with the respective series inductor 230, 234, resulting in damage to the ballast circuit 150. The purpose of the resettable fuse 276, 282 is to limit the current in the bypass circuit until the defective bulb 260, 266 is removed. The resettable fuse is a positive temperature coefficient resistor having a resistance element that increases in value as the current through it increases. The resettable fuse in the illustrated embodiment is a type MF-R010 available from Bourns Inc., Riverside, Calif. The resistance of the resettable fuse 276, 282 also damps any tendency of the bypass capacitor to enter a resonant state in combination with the respective series inductor 230 or 234. The purpose of the switch 272, 278 is to open the respective accommodation circuit 156 when a defective bulb is removed, thus permitting the remaining CFL bulb to continue operation. When a bulb is installed in its respective receptacle, the switch contacts are closed, connecting the switch 272, 278 in series with the bypass capacitor 274, 280 and the resettable fuse 276, 282 across the terminals of the respective CFL bulb 260, 266.

In the foregoing description of the bulb accommodation circuit 156, values were disclosed for the inductors 230, 234 and the capacitors in the circuit that affect the frequency of resonance under several conditions for the illustrated embodiment. When constructing other embodiments of this circuit, several factors about the component values should be kept in mind, as will be understood by persons skilled in the art. The dominant capacitance in the circuit is the internal capacitance of the CFL bulbs, which is approximately 0.003 uF (or 3 nF), and which may vary over a fairly wide range, depending upon the particular bulb manufacturer and the normal production variations that may be expected. It will be appreciated that the value of the blocking capacitor 242, 244, at 0.022 uF, is much larger than the internal bulb capacitance, so that it will have only a small effect upon the resonant frequency because it appears in series with the internal bulb capacitance. It will also be appreciated that the value of the bypass capacitor 274,280, at 0.0015 uF, is substantially smaller than the internal bulb capacitance, so that its affect upon the resonant frequency is again relatively small. In the latter case, the bypass capacitor, being in parallel with the internal bulb capacitance, results in a combined (it is additive) capacitance of approximately 0.0045 uF. This combined capacitance is in series with the blocking capacitor. Thus, the total capacitance, including the blocking capacitor in series with the 0.0045 uF combination, is approximately 0.0037 uF (or 3.7 nF), which is still relatively close to the nominal—and variable—internal capacitance of the CFL bulbs. It is this total capacitance which resonates with the inductors in each respective bulb accommodation circuit 156 at a frequency of approximately 32 Khz.

Figure 6:
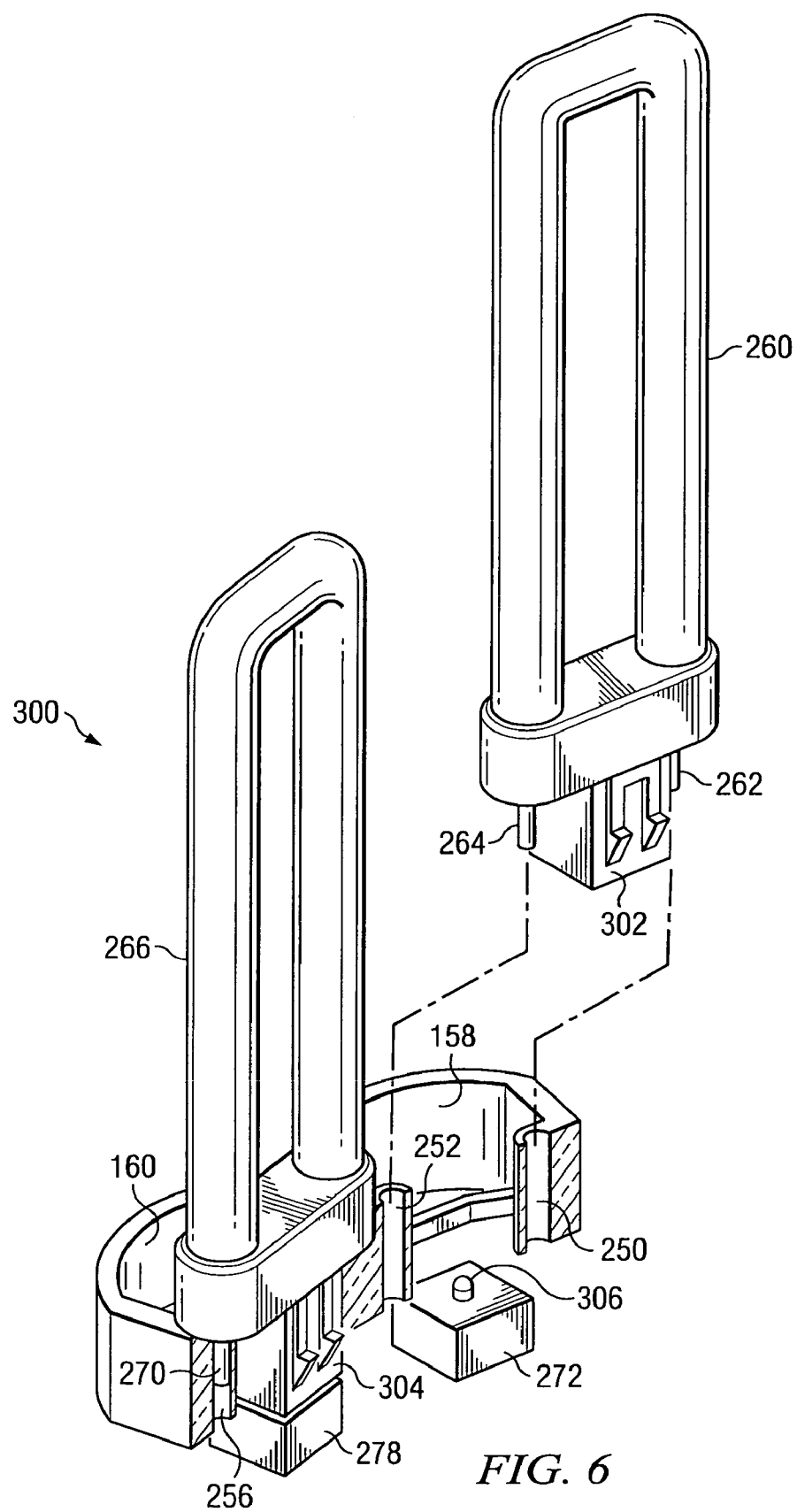
FIG. 6 illustrates a pictorial view, partially exploded, of one embodiment of the assembly of CFL bulbs and their receptacles as employed in the fluorescent task lamp according to the embodiment of FIG. 1.

Referring to FIG. 6 there is illustrated a pictorial view, partially exploded, of one embodiment of the assembly 300 of first and second CFL bulbs 260, 266 and their receptacles as employed in the fluorescent task lamp according to the embodiment of FIG. 1. Portions of the first and second receptacles 158, 160 are shown, including first and second terminals 250, 252 of the first receptacle 158, as well as a second terminal 256 of the second receptacle 160. The first CFL bulb 260, and its first and second terminals 262,264 is shown removed from its respective receptacle 158 but aligned therewith by the broken lines. The second CFL bulb 266 is shown fully plugged into its respective receptacle 160, with a first terminal 270 of the second CFL bulb 266 fully inserted into the terminal 256 of the second receptacle 160. Further, each of the first and second CFL bulbs 260, 266 include a base 302, 304 respectively. Positioned in the lower portion of each receptacle 158, 160 is a SPST switch which completes the bulb accommodation circuits 156 as previously described. When fully inserted into its respective receptacle, the base 302 of the first CFL bulb 260 operates the movable contact 306 of the corresponding SPST switch 272 to close the switch 272 and connect the bypass capacitor 274 and resettable fuse 272 into the bulb accommodation circuit for the first bulb 260. Similarly, when fully inserted into its respective receptacle, the base 304 of the second CFL bulb 266 operates the movable contact (not visible in FIG. 6) of the corresponding SPST switch 278 to close the switch 278 and connect the bypass capacitor 280 and resettable fuse 282 into the bulb accommodation circuit for the second bulb 266.

The switches 272, 278 shown in FIG. 6 are small micro switches configured to be placed just below the respective receptacles 158, 160 so that the depression of the movable contact, e.g., contact 306, may cause the switch contacts inside the switch to close whenever a bulb is fully inserted into the respective receptacle. As persons skilled in the art will realize, however, there are many kinds of switch that may implemented in this example to fulfill the function of the switch 272, 278. These may include, but are not limited to, switches (not shown) operated by optical (photo diode) devices, Hall effect or reed switch mechanisms, or simply a pair of beryllium-copper contact strips secured in the receptacles themselves and configured to be closed by the insertion of the bulb into the receptacle. Moreover, the switches may be utilized to control other functions in the electronic ballast circuit 150 of the present disclosure.

Figure 7:
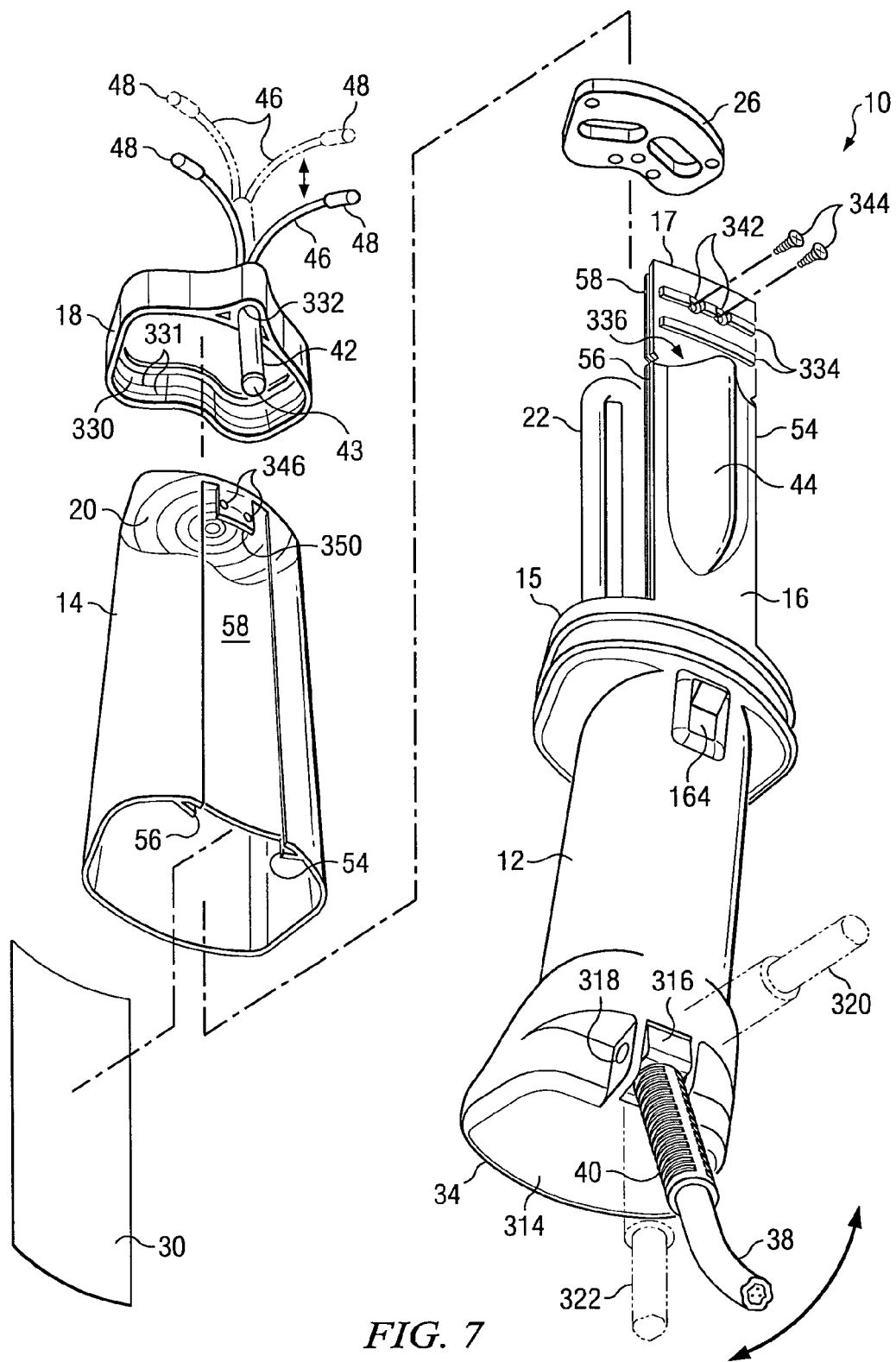
FIG. 7 illustrates an exploded view of major components of the fluorescent task lamp according to the embodiment of FIG. 1.

Referring to FIG. 7 there is illustrated an exploded view of major components of the fluorescent task lamp 10 according to the embodiment of FIG. 1, as viewed from a perspective below and rearward of the task lamp 10. Included are the housing 12, the clear lens body 14, the elongated spine 16, the flexible cap 18, the closed end 20 of the lens body, a first CFL bulb 22, the resilient bulkhead 26, the reflector 30, the integral base 34, the line cord 38, the pivoting strain relief 40, the ON/OFF switch 164, and the rod 42 that supports the hooks 46 having the nylon tips 48, all of which were previously described in the description of FIGS. 1 and 5 supra. In order of assembly, the reflector 30 is attached to the forward face of the reflector panel 58 using an adhesive, the first and second (not shown in FIG. 7) CFL bulbs 22, 24 are installed in their respective receptacles (not shown in FIG. 7), the resilient bulkhead 26 is inserted into the interior of the lens body 14 to a position approximately ⅜ inch from the closed end 20 of the lens body 14, and the first and second rails 55, 57 molded into the reflector panel 58 of the lens body 14 are aligned with the corresponding grooves 54 (not visible in FIG. 7), 56 formed into the edges of the elongated spine 16 (as previously described in the description of FIG. 2 supra), and the lens body 14 is pushed along the rails 55, 57 and grooves 54, 56 until it is seated within the open end 15 of the housing 12.

Other features of the task lamp 10 visible in FIG. 7 but concealed in the previous FIGS. 1 and 2 include the flat bottom 314 of the integral base 34 and the pivoting end 316 of the pivoting strain relief 40 that pivots within an opening 317 of the housing 12 about a strain relief pivot pin 318 passing through the sides 319 of the opening 317. As indicated by the positions 320 and 322, shown in phantom, the pivoting strain relief 40 swings through an angle of approximately 90 degrees between the upper position 320 that is approximately perpendicular to the rear of the housing 12 and the lower position 322 that is approximately parallel to a longitudinal axis of the housing 12. This range of motion enables the line cord to be positioned out of the way and/or at an angle that permits the task lamp 10 to be stood on its base or hung by its hooks in a natural manner. At the opposite end of the task lamp 10, the flexible cap 18 includes an interior surface 330 that is formed with several low profile ribs 331 that function to retain the cap 18 on the closed end 20 of the lens body 14. The flexible cap 18 further includes a bore 332 for receiving the post 42 therein. The bore 332 provides a slightly interfering fit for the post 42, such that the post 42 may be moved rotationally and longitudinally within the bore 332 yet retained by the friction of the interfering fir when the post is adjusted by the user to position the hooks 46 in a particular orientation. For example, the hooks 46 may be moved longitudinally between the extended 340 and retracted 342 positions, or rotationally through an angle of 360 degrees (not shown). Also visible on the lower end of the post 42 is a rounded knob 43 that functions to retain the post 42 captured within the cap 18. When in the retracted position the post 42 is stored within a passage 336 molded into a bulge 44 in the rearward side of the elongated spine 16, as will be described infra.

Still other features of the task lamp 10 visible in FIG. 7 but concealed in the previous FIGS. 1 and 2 include an upper or distal end 17 of the elongated spine 16, a mounting tab 350 having one or more mounting holes 346 (two are shown) and formed into an upper end of the backside of the lens body 14, and a bulge 44 formed into the rearward side of the elongated spine 16. The bulge 44 increases the cross section of the elongated spine 16 to provide greater strength and provides space within it to accommodate the movement of the post 42 that supports the hooks 46 in an adjusted position. Further, the distal end 17 of the elongated spine 16 includes one or more mounting holes 342 therethrough for receiving the one or more mounting screws 344 for securing the lens body 14 to the distal end of the elongated spine 16 during assembly. The distal end 17 of the elongated spine 16 may also include several low profile ribs 338 to engage with the low profile ribs 331 within the cap 18. Together, the ribs 338 and 331 help to retain the cap 18 in place on the lens body 14.

Figure 8:
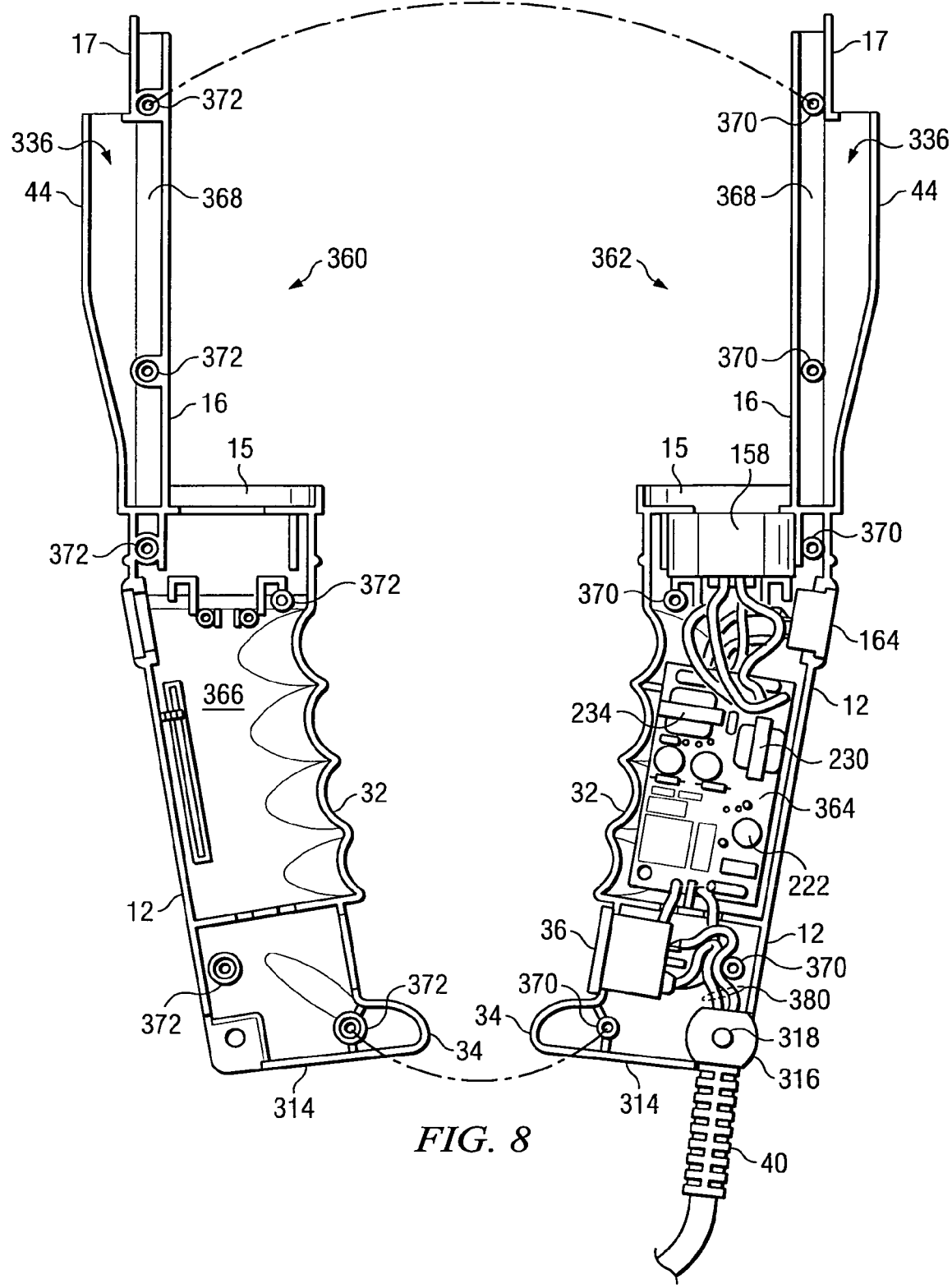
FIG. 8 illustrates a pictorial view of separated first and second halves of one embodiment of the housing of the fluorescent task lamp according to the embodiment of FIG. 1, wherein the electronic ballast circuit is installed in the handle portion of one of the halves of the housing.

Referring to FIG. 8 there is illustrated a pictorial view of separated first 360 and second 362 halves of the housing of the fluorescent task lamp 10 according to the embodiment of FIG. 1, wherein the electronic ballast circuit board 364 is installed in the handle portion of the second half 362 of the housing 12. A corresponding space 366 is provided in the first half 360 of the handle portion of the housing 12 to accommodate electronic components of the electronic ballast circuit 150 (See FIG. 5). Some of these electronic components include the pulse transformer 222 and the first and second inductors 230, 234. It will be appreciated that, in the illustrated embodiment, the elongated spine 16 is an integral extension of the housing 12 because each half of the housing assembly is a single molded part. This construction and the material selected are chosen to provide the necessary strength and a prescribed amount of flexibility such that the combination of the housing 12 and elongated spine 16 assembly can support and protect the more vulnerable components of the task lamp 10. The result is a housing assembly that distributes impact forces from mechanical shock to minimize the effects on the relatively fragile CFL bulbs and other vulnerable components. In other embodiments, the elongated spine 16 and the housing 12 may be configured as separate components provided they are designed to take into account the strength and shock absorbing requirements noted herein above.

It was previously mentioned in the detailed description of FIG. 2 that the elongated spine 16 includes a hollow space 50 within it. This space is the same as the space 368 designated within each of the first 360 and second 362 halves of the elongated spine 16 shown in FIG. 8. The space 368 may be used to enclose wiring or circuitry for additional features of the task lamp 10. Such additional features may include but not be limited to point source light emitting devices, lighting controls, metering or status indicators, connectors for auxiliary devices, and the like.

All of the other features identified in FIG. 8 have been previously described and bear the same reference numbers referred to in those descriptions. These features include the housing 12, the elongated spine 16 and its distal end 17, the finger grip 32, the integral base 34, AC outlet 36, line cord 38, pivoting strain relief 40, and the bulge 44 in the elongated spine 16. It will be further noted that the wiring 380 (including three conductors for line, neutral and ground wires) connecting the conductors enclosed within the strain relief 40 to the AC outlet and the circuit board 364 include a prescribed amount of excess length to enable the pivoting of the strain relief 40 with minimal flexing of the wiring 380. Other features previously described also include the first receptacle 158, the ON/OFF switch 164, the flat bottom 314 of the integral base 34, the pivoting end 316 of the pivoting strain relief 40 and the strain relief pivot pin 318. Also shown in FIG. 8 are open mounting holes 370 in the second half 362 of the housing 12 and elongated spine 16 (See six places) and bosses 372 (See six places) in the first half 360 of the housing 12 and the elongated spine 16 for receiving mounting screws (not shown) for securing the first 360 and second 362 halves of the housing 12 and elongated spine 16 together. The inclination angle between the longitudinal axes of the housing 12 and the elongated spine 16 is approximately 9 degrees for the embodiment shown, as previously described.

While the invention has been shown in only one of its forms, it is not thus limited but is susceptible to various changes and modifications without departing from the spirit thereof. For example, while the self-starting electronic driver circuit in the electronic ballast is illustrated for use with two 9 Watt CFL bulbs, the circuit is readily scalable for other bulb ratings or power requirements by an appropriate change in the component values, such as the inductance, capacitance and resistance values of the passive components, current, voltage, and dissipation ratings for the semiconductors, etc. Substitutions in the materials are also possible, keeping in mind the functions performed, as new materials become available or new applications demand that different materials than those suggested for the illustrative embodiment. The present invention may further be configured for operation from other values of AC operating voltages than the 120 Volts AC 50/60 Hz such as 208, 220, or 240 Volts AC, 50/60 Hz. 400 Hz power may also be used with appropriate modification to the components selected.

What is claimed is:

1. An electronic ballast circuit for a fluorescent task lamp, comprising:
 a power supply controlled by an ON/OFF switch;
 a self-starting electronic driver circuit operated by the power supply and operable to start and run at least first and second CFL bulbs from a single output;
 first and second receptacles coupled in parallel to the single output of the driver circuit for connecting respectively a first terminal of the first and second CFL bulbs to the output of the driver circuit; and
 a bulb accommodation circuit in the electronic driver circuit that enables operation of the electronic ballast circuit independently of the type of CFL bulb connected to either first or second receptacle.

2. The circuit of claim 1, wherein the self-starting electronic driver circuit is operable to operate both starter and non-starter type CFL bulbs coupled to the single output.

3. The circuit of claim 1, wherein the bulb accommodation circuit in the electronic driver circuit enables operation of the driver circuit with either starter or non-starter type CFL bulbs and regardless whether one or both of the first and second CFL bulbs are connected to the single output.

4. The circuit of claim 1, wherein the self-starting driver circuit comprises:
 a totem pole output stage having first and second transistors coupled across the power supply; and
 a trigger circuit coupled across the power supply and operable to supply a triggering current via a bilateral diode coupled between a voltage source and an input to one of the first and second transistors.

5. The circuit of claim 1, wherein a first and a second inductor is coupled respectively between the single output of the driver circuit and the first terminal of each first and second CFL bulb enabling an operating current to flow in each respective first and second CFL bulb.

6. The circuit of claim 5, wherein a first and a second capacitor is coupled respectively between a second terminal of each CFL bulb and the output of the power supply.

7. The circuit of claim 5, wherein the first and second inductors respectively support an oscillation having a resonant frequency with an internal capacitance of the respective first and second CFL bulb for starting the illumination of the first and second CFL bulbs.

8. The circuit of claim 5, wherein the first and second inductors respectively provide an inductive reactance for limiting the operating current in the first and second CFL bulbs.

9. The circuit of claim 1, wherein the bulb accommodation circuit further comprises:
 a third capacitor and a first current limiting device coupled in series across each first and second CFL bulb; and
 a first SPST switch, having contacts disposed in a closed condition when a CFL bulb is present in its respective receptacle in the driver circuit and disposed in an open condition when the CFL bulb is absent therefrom, coupled in series with the third capacitor and the first current limiting device.

10. The circuit of claim 9, wherein the third capacitor coupled across each first and second CFL bulb enables starting of a starter type CFL bulb connected to the corresponding first or second receptacle.

* * * * *